Aug. 15, 1950 — H. E. COLLETT — 2,519,024
OVERHEAD VALVE SPRING REMOVER
Filed Oct. 6, 1947 — 2 Sheets-Sheet 1
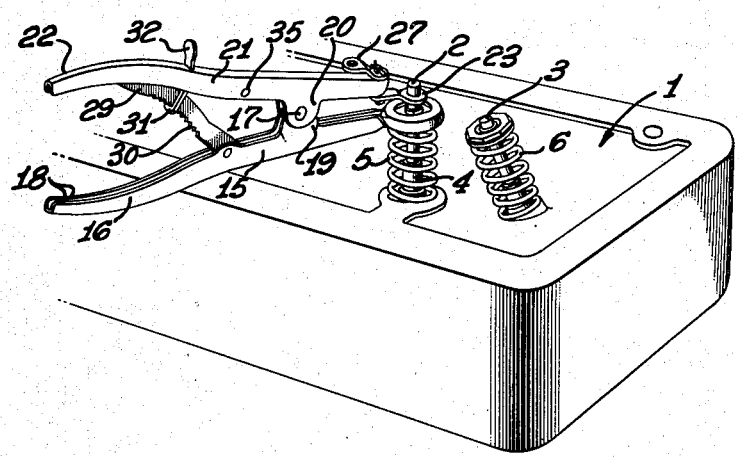
Fig. 1
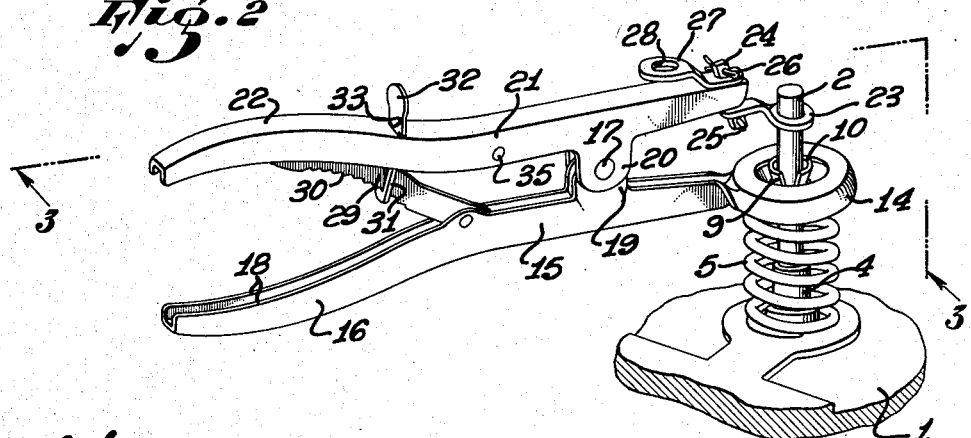
Fig. 2
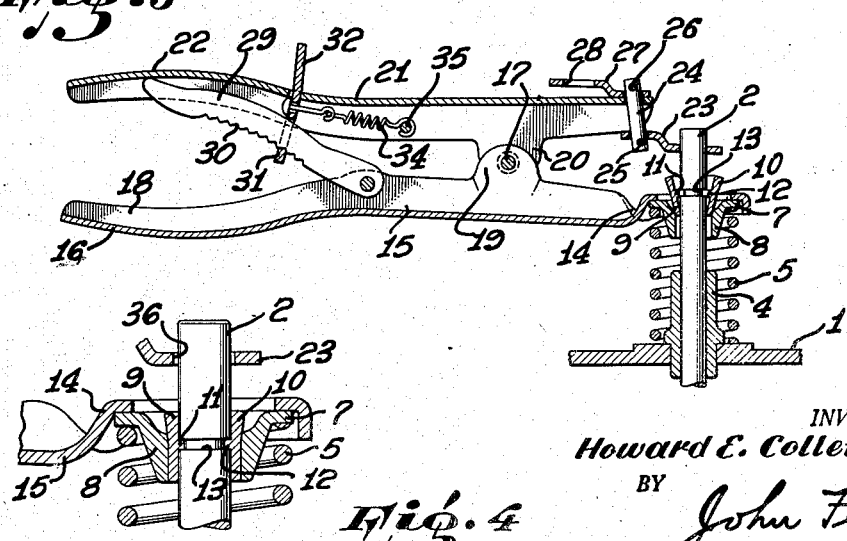
Fig. 3
Fig. 4
INVENTOR.
Howard E. Collett,
BY
John Flam
ATTORNEY.

Aug. 15, 1950     H. E. COLLETT     2,519,024
OVERHEAD VALVE SPRING REMOVER
Filed Oct. 6, 1947     2 Sheets-Sheet 2
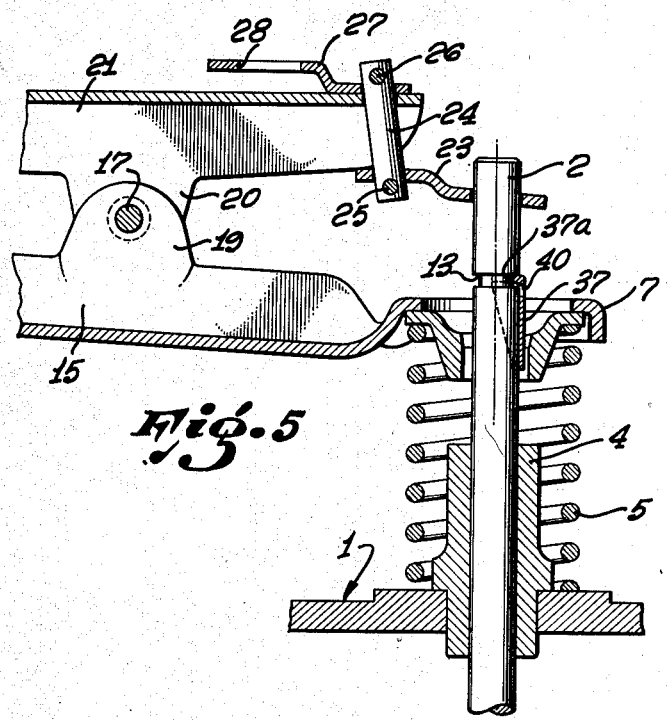
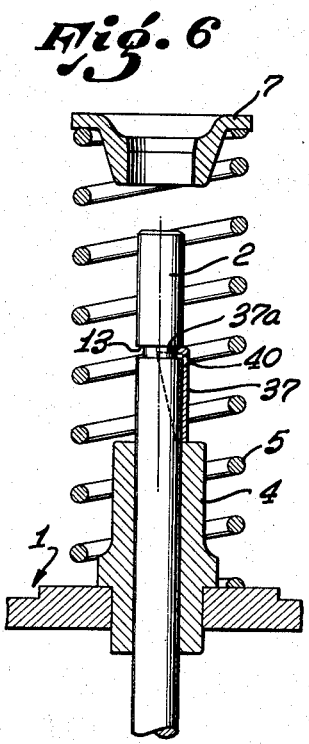
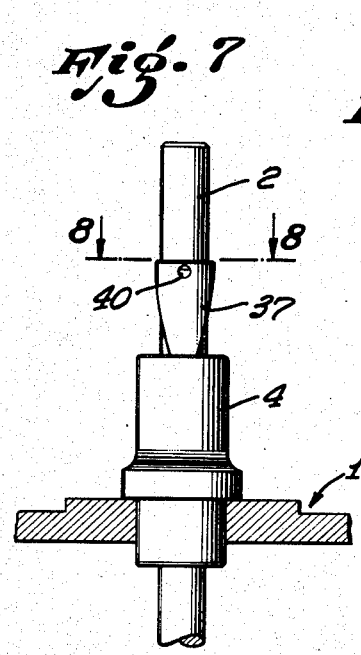
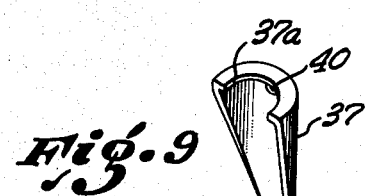
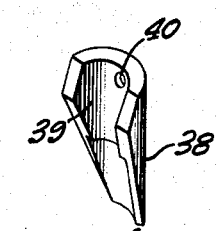
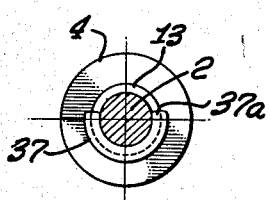
INVENTOR.
Howard E. Collett,
BY John Flam
ATTORNEY.

Patented Aug. 15, 1950

2,519,024

UNITED STATES PATENT OFFICE 2,519,024

OVERHEAD VALVE SPRING REMOVER

Howard E. Collett, Redondo Beach, Calif.

Application October 6, 1947, Serial No. 778,113

2 Claims. (Cl. 29—221)

This invention relates to a tool for use in connection with the installation and removal of parts associated with valves for internal combustion engines.

In automobile engines, especially of the overhead valve type, the valves controlling the inlet of fuel and the exhaust have disc-like closures with stems extending through the cylinder heads. Around the stems are provided stiff coil springs urging the valves to closed position. These springs act against collars mounted on the stems. Each of the collars in turn is restrained axially with respect to the stem by the aid of wedge elements inserted between the collar and the stem, the force of the spring acting on the collar serving to maintain the wedges in place.

These springs often break or deteriorate; and, when it is required to remove a spring, the wedges must be freed from the collar and removed; then the collar and the spring can be lifted off the stem.

The reverse process of assembling the collar on the stem also necessitates holding the spring and the collar in place while inserting the wedges, and, lastly, releasing the spring and collar to cause the collar and wedges to engage.

Various tools have been proposed and used to facilitate removal of these wedges, but they are expensive and difficult to use.

It is, accordingly, one of the objects of this invention to provide a simple and easily operated hand tool for the removal of valves of the valve-in-head types of internal combustion engines; and to remove and replace, in a few minutes, weak, broken, or damaged springs without removing the cylinder head. This quick and easy operation, requiring only a few minutes, makes it unnecessary to use mechanics now commonly employed for this operation.

It is another object of this invention to make it possible to urge the collar and spring axially to free the wedges by clamping one element of the tool upon the stem. The number of operating parts of the tool is thus materially decreased.

It is another object of this invention to make it possible to keep the valve stem from dropping through its guide after the wedges have been removed, and before a new spring is inserted.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of this invention is best defined by the appended claims.

Referring to the drawings:

Figure 1 is a pictorial view of a tool incorporating the invention, and shown as placed in position on a valve stem;

Fig. 2 is an enlarged view of the tool after it has been operated to release the valve spring collar from the valve stem;

Fig. 3 is a sectional view of the tool and the valve parts, taken along a plan corresponding to line 3—3 of Fig. 2;

Fig. 4 is a fragmentary view, showing the gripping member cooperating with the valve stem prior to operation of the tool;

Fig. 5 is a view similar to Fig. 2, showing the manner in which the valve stem is kept from dropping through the guide, after the wedges are removed, by the aid of a collar;

Fig. 6 is a view silimar to Fig. 5, but showing the spring in fully expanded position;

Fig. 7 is a side view showing the stem and spacer after the spring has been removed;

Fig. 8 is a sectional view, taken along plane 8—8 of Fig 7;

Fig. 9 is a perspective view of the spacer; and

Fig. 10 is a perspective view of a modified form of spacer.

In the present instance, a cylinder head 1 of the valve-in-head type engine is illustrated, in connection with which the tool can be used. In this head are supported a plurality of valve structures, each of which includes a stem 2 or 3. These stems, as shown most clearly in Fig. 3, may be guided for axial movement, as by a guide 4 which extends through the head 1. In the present instance, the stem 3 is at an angle to the vertical, this being an arrangement encountered with some types of engines. The valve stems, such as 2 and 3, project inwardly of the head and carry the usual valve closure members.

In order to urge the valve closure members to a definite biased position, stiff compression springs, such as 5 and 6, are provided and which surround the respective stems 2 and 3.

The lower end of stiff spring 5 abuts the upper surface of the head 1. The upper end of the spring 5 abuts the lower surface of spring collar 7 which is disposed around the stem 2. This spring collar 7 has a hub 8.

The operation of the tool for releasing collar 7 will be described in connection with the valve stem 2; but it may, as well, be operated in connection with valve stem 3. This tool, however, is especially useful with such slanting stems, since it can be readily fitted thereto.

In order to anchor the hub 8 to the stem 2, and thereto to restrain the collar 7 from axial movement with respect to the stem 2, use is made of a wedging mechanism (Figs. 3 and 4). Thus, the hub 8 has a larger internal diameter than the diameter of the stem 2, and may be slightly conical. Insertable between the hub 8 and the stem 2 are a pair of wedges 9 and 10. These are generally of semi-circular form. They are each provided with an internal rib 11 and 12 adapted to be received in the shallow groove 13 on the stem 2. The expanding force of the spring 5 urges the wedges securely into restraining position within the hub 8, and keeps the collar 7 in proper anchored position with respect to the stem 2. All of this is well known in connection with internal combustion valve structures. It is therefore not necessary to describe their mode of operation or construction in any further detail.

If it should be required to renew or replace a valve or its spring, the hub 8 must be released from the stem 2, and the spring 5 may be removed from the stem. In order to accomplish this, a force must be exerted downwardly upon the collar 7 so as to release the wedges 9 and 10. This compressed position of the spring 5 is illustrated in Figs. 2 and 3. In this position, the wedges 9 and 10 may be removed, and then the collar 7 may be released so that it may be withdrawn from the stem 3.

The tool by the aid of which this compression of the spring 5 is effected includes a jaw 14. This jaw 14 is generally circular, and is adapted to fit over the collar 7. It is provided with a depending flange nesting over the edge of the collar 7. It can readily be passed over the stem 2.

In order to exert a downward force on the jaw 14, it is carried by a lever 15. This lever 15 is shown, in this instance, as having a handle extension 16, and is pivoted by the aid of ears 19 on a pin 17 which can be assumed now to be restrained against movement. Thus, upon pulling upwardly on the handle 16, the jaw 14 is urged downwardly and causes compression of the spring 5. Handle 16, as will be described hereinafter, forms one element of a tool resembling jaw pliers.

The lever 15 is shown, in this instance, as formed of thin metal reenforced by deep side flanges, such as 18, from which project the ears 19.

The pivot pin 17 is restrained so that it may act as a stationary fulcrum for the lever 15 by aid of the other lever element 21 of the tool.

Pin 17 passes through the ears 19 of the lever 15, as well as the ears 20 of the said lever 21. This lever 21 is generally formed in the same manner as lever 15, the ears 20 extending over the ears 19. It is provided with a handle 22 disposed directly above the handle 16. Upon grasping these handles and urging them together, the jaw 14 is moved downward.

In order to hold the lever 21 in fixed position, a gripping member 23 is provided which detachably engages and grips the upper portion of the stem 2, and which is carried by the end of the lever 21. This gripping member 23 operates by a cocking action on the stem 2. Thus, it is provided with a through aperture 36 (Fig. 4) that is only slightly larger than the diameter of the stem 2. The cocked position is illustrated in Figs. 2 and 3. In this position, the stem 2 is firmly gripped, and the member 23 has tilted in a clockwise direction sufficiently to form a tight grip.

This gripping member 23 is loosely carried by the lever 21 so that member 23 can readily accommodate itself to the cocking position where it grips the stem 2. When the handles 16, 22 are grasped, the forces urge the jaw 14 and member 23 apart; and the effect is that this member tilts to the cocked position of Fig. 3.

For mounting the grip member 23 at the free end of lever 21, a bar 24 is provided. This bar extends loosely through the lever and passes loosely through the grip 23. A pin 25 extends through the lower end of the bar 24, beneath member 23, to keep this member in place. A cotter pin 26 passes through the upper end of the bar 24 to prevent it from dropping through the clearance aperture in the lever 21. Furthermore, since valve stems may have slightly different diameters, the tool is provided for an alternate gripping member 27, which can, for convenience, be disposed underneath the cotter pin 24. The aperture 28 in this gripping member has a diameter different from that of aperture 36 (Fig. 4), so as to grip a stem of a different size by appropriate cocking action. It can replace the gripping member 23, when desired, by removing the cotter pin 26 and bar 24, then replacing the gripping member 23 by the gripping member 27 and re-assembling it in the position shown in Fig. 2.

In order to hold the levers 15 and 21 in the expanding position of Fig. 2, against the force of spring 5, use is made of a detent mechanism. Thus, pivoted between the flanges 18 of the lower lever 15 is a bar 29 having serrations 30 at its lower edge. These serrations are adapted to be engaged by detent 31, having an aperture through which the bar 29 extends.

The lower edge of the detent is arranged to be received between adjacent serrations to keep the upper end of bar 29 against the lower surface of handle portion 22.

Detent 31 is supported on the lever 21. For example, this detent 31 may be made of sheet metal and have a projecting handle portion 32 that is wider than the detent 31. The detent 31 can be inserted into an appropriate slot 33 in the lever 21. The shoulders formed between the detent 31 and portion 32 form fulcrums for tilting of the detent. A tension spring 34 (Fig. 3) is anchored by the pin 35 on the lever 21 and exerts a force pulling the detent 31 to engaging position with the serrations. Thus, as the handles 16 and 22 are squeezed together by the hand of the operator, the serrations 30 can slip past the detent 31. However, upon release of the pressure of the handles 16 and 32, the detent 31 prevents spreading of these handles. In order to permit spreading of the handles, the detent 31 may be tilted in a clockwise direction by manipulation of the projecting handle 32. This causes the serrations 30 of bar 29 to clear the detent, and the bar can move toward the left as viewed in Fig. 3.

The manner of use of the tool may now be summarized. The gripping member 23 is passed over the stem 2. The jaw 14 is disposed on top of the collar 7. Now, by grasping the two handles 16 and 22 and urging them together, the lower lever 15 is moved in a clockwise direction, and the upper lever is restrained by the cocking action of the grip 23. When the collar 7 has been moved downward sufficiently to release the wedges 9 and 10, the handles 16 and 22 are released, and they remain in the position such as is indicated in Fig. 3. The wedges 9 and 10 may now be removed.

It is desirable to hold the stem 2 against dropping down after collar 7 has been released. For this purpose, use is made of a spacer 37 (Figs. 5, 6, 7, 8, and 9) that can be attached to stem 2. This spacer is attached to the stem 2 to replace wedges 9 and 10 while the tool is in the active position of Fig. 2.

In order to attach the spacer 37 to the stem 2, this spacer at its upper end has an angular extent slightly greater than a semi-circle, and fits the diameter of stem 2. It carries a flange 37a, fitting into groove 13; and it can be readily snapped into place on the stem after wedges 9 and 10 have been removed. The resilience of the spacer holds it in place.

The outer diameter of spacer 37 is less than that of the central bore in collar 7. Accordingly, after the spacer is inserted, the tool can be released from stem 2, and the collar 7 can be pulled over the spacer 37 until the lower end of the spacer rests on guide 4 (Figs. 6 and 7). The tool is released by gripping handles 16 and 22 and releasing detent 31.

In some instances, as in Buick engines, the stem has a wider, shallow groove. For such stems, a spacer 38 (Fig. 10) can be used, having an upper portion 39 that can be snapped into the wide groove. This portion has an angular extent slightly greater than a semi-circle in order that the resilience of the spacer may be effective to retain it in place.

In both forms, an aperture 40 is provided to permit a tool to be used to remove the spacer from the stem.

As soon as the tool is released in the manner described, the spring 5 expands (Fig. 6); and it, as well as the collar 7, can be removed.

To replace a spring, it and the collar are first passed over the spacer and stem 2. Then the tool is applied to force the collar down. The stem 2 can be lifted, the spacer 36 removed, and the wedges 9 and 10 applied. Then the tool can be removed.

The inventor claims:

1. In a tool of the character described: first and second levers pivoted to each other; said first lever having an aperture adjacent one end thereof; a rod extending through the aperture with its axis disposed in a plane including and extending lengthwise of both of said levers; a gripping member carried loosely by the rod and having an aperture through which a valve stem may extend, said gripping member cocking with respect to the stem and first lever to grip the periphery of the stem; said second lever having means thereon in substantial alignment with said gripping member for engaging a valve spring collar simultaneously with peripheral engagement of said stem by said gripping member.

2. In a valve spring compressing tool of the character described, a gripping member having an aperture therethrough and adapted loosely to fit a valve stem and when canted to grip the periphery of the valve stem, a pair of elongated levers pivoted to each other intermediate their ends to form a plier like construction providing hand grips on one side of the pivot and jaw extensions at the other side, means loosely supporting said member upon the jaw extension of one of said levers for movement relative to said one lever into and out of gripping engagement with the valve stem, and an annular valve spring engaging member mounted on the jaw extension of the other lever for engaging a valve spring collar.

HOWARD E. COLLETT.

REFERENCES CITED

The following references are of record in the file of this patent:

UNITED STATES PATENTS

| Number | Name | Date |
|---|---|---|
| 1,348,701 | Everitt | Aug. 3, 1920 |
| 1,608,883 | Justus | Nov. 30, 1926 |
| 1,875,595 | Harris et al. | Sept. 6, 1932 |
| 1,879,024 | Barto | Sept. 27, 1932 |
| 1,949,343 | Wood | Feb. 27, 1934 |
| 1,978,543 | Madeira | Oct. 30, 1934 |
| 2,268,378 | Berkman | Dec. 30, 1941 |
| 2,286,695 | Taylor | June 16, 1942 |
| 2,427,045 | Cook | Sept. 9, 1947 |